United States Patent [19]

Wood

[11] Patent Number: 4,970,771

[45] Date of Patent: Nov. 20, 1990

[54] BALL PULLER

[76] Inventor: Thomas H. Wood, 3008 W. 5650 South, Roy, Utah 84067

[21] Appl. No.: 390,533

[22] Filed: Aug. 7, 1989

[51] Int. Cl.[5] .......... B23P 19/04

[52] U.S. Cl. .......... 29/263

[58] Field of Search .......... 29/256, 257, 263, 259, 29/258, 281.1, 239

[56] References Cited

U.S. PATENT DOCUMENTS

| | | | |
|---|---|---|---|
| 837,577 | 12/1906 | Loud | 29/257 |
| 3,305,921 | 2/1967 | Morse | 29/263 |
| 3,611,540 | 10/1971 | Gibu | 29/263 |

*Primary Examiner*—Robert C. Watson

*Attorney, Agent, or Firm*—Trask, Britt & Rossa

[57] ABSTRACT

An apparatus for removing the spherical ball from a support shaft in a joint assembly is disclosed. The apparatus includes a housing defining a pair of orthogonally directioned, intersecting channels therein. The channels form a recess well configured to receive a ball to be removed. A drive shaft inserted in a third channel defined in the housing provides a means of applying force to the ball's support shaft, thereby causing the housing to abut against the ball and disengage it from its support shaft mounting.

13 Claims, 3 Drawing Sheets

BALL PULLER

BACKGROUND

1. Field

This invention relates to apparatus adapted for removing a spherical ball from a support shaft in a joint assembly.

2. State of the Art

Of the many types of known mechanical joints, the class denominated as a constant velocity joint is in common use, especially in the construction of automobile drive lines. Such joint assemblies may be denominated saginaw-style constant velocity or double cardan universal joint assembly. Conventional C.V. joint assemblies may include a spherical ball supported by a cylindrical stud positioned within a hollow channel defined within the ball itself. Due to wear on the ball, it becomes necessary, as a matter of routine maintenance, to remove the worn ball from its supporting stud and replace it with a new ball.

Efforts to simplify this removal procedure initially involved the use of torches or punches. Observably, these procedures involved a considerable risk of damage to the support and its supporting yoke assembly. Later efforts included the development of a tool known as a Kent-Moore tool no. J23996-02 which is referenced in "MOTOR" Auto Repair Manual, 45th edition, section 2, page 93.

The Kent-Moore tool is a three-piece device shown to advantage in FIGS. 1 and 2. As illustrated, the tool includes a main retainer shaft A, a housing B and a lock nut C. The retainer shaft A includes a cylindrically-shaped section D having a generally elliptical cross-sectioned bore E which extends through the thickness of the section. The bottom region of the section is open. As shown in FIG. 1, the section D defines two jaw-like extensions F which each include an inwardly extending lip G proximate the free end thereof.

The shaft A further includes a male threaded elongate member H mounted atop the cylindrical section D. A wrench tab fitted extension I is mounted atop the male threaded member H.

Housing B is a right cylinder shaped structure which defines a hollow interior. As shown to advantage in FIG. 2, the hollow interior communicates with two ports defined within the exterior surface of the housing. The member H is threadedly inserted through the female threaded retaining lock nut C to form the assembled structure shown in FIG. 2.

In use, the Kent-Moore tool is placed over a ball J to be removed. Typically, the tool is positioned beside the ball J and then moved laterally toward the ball. The bore is dimensioned to receive the ball, as the jaw-like extensions F are positioned about the circumference of the ball with the lips G being positioned below the ball as shown in FIG. 1.

Subsequently, the user positions a first end wrench on the wrench tabs of extension I. A second end wrench is positioned on the faces of lock nut C. With the first wrench being held stationary, and thereby retaining the shaft A substantially non-rotating, the second wrench is turned clockwise, causing a threaded upward displacement of the shaft A within housing B. As the lips G engage the lower surface of the ball J, the lower end of housing B is abutted against the stud support yoke K. As the nut C is further rotated, the lips G exert an upwardly directed force against the lower surface of the ball J, which eventually causes the ball to be separated from its support stud L. With the ball J extracted from its support stud L, the tool may be removed from the work site.

The operation of the Kent-Moore tool tends to wedge the extensions F outward due to the camming action of the ball J and the pressure created along the axial line of the tool. This distortion of the extensions F tends to shorten the effective work life of the tool.

Due to the particular structure of the tool, namely the wrench tab extension I on shaft A, the use of a socket wrench or power wrench is precluded as a driving means in that the shaft A and housing B tend to rotate during operation.

There continues to be a need for apparatus adapted for suitably removing a ball from its support stud which at once is operable by use of a socket or power wrench and, further, avoids the distortion resultant from the Kent-Moore tool's operation.

SUMMARY OF THE INVENTION

The invention discloses an apparatus adapted for removing a ball from its support stud which may be used in conjunction with a socket wrench, power wrench or conventional slide hammer. The apparatus is configured to limit structural deformation resulting from the forces incurred during the ball removal process.

The apparatus includes a housing defining three channels therein. A first, generally circular, cross-sectioned channel extends through an upright sidewall of the housing and extends laterally and partially through the thickness of the housing. The closed endwall of the channel is structured to present a generally concave configuration. A second, generally semicircular cross-sectioned channel extends vertically through the bottom of the housing and orthogonally intersects the first channel. The conjunction of the two channels forms a recess well dimensioned to receive a ball. The housing further defines two laterally extending lips configured to be positioned beneath the ball and thereafter to abut against the lower surface of the ball.

A third channel extends vertically downwardly from the top surface of the housing, and subsequently intersecting orthogonally the first channel. The sidewalls which define the third channel include a plurality of female threads.

A male threaded drive shaft having a polygonal head may be threadedly inserted through the third channel, whereby the end of that shaft or bolt is insertable through the third channel and thereafter into the first channel. The third channel is oriented so as to position the drive shaft to abut against the support stud of a ball positioned within the recess well defined by the first and second channels.

The housing may define a pair of wrench tabs proximate its upper end whereby the user may mount a wrench to retain the housing stationary over a work site. The head of the drive shaft may thereafter be rotated by a suitable means, e.g. a socket wrench or power wrench, causing the housing to be displaced upward. During that displacement, the housing lips engage the ball and exert an upwardly directed force thereon which results eventually in the ball being pulled from the support stud.

Noticeably, the structure of the housing proximate the recess well is configured to maximize the stress absorption capabilities of the housing, while minimizing the possibility of its deformation under stress.

Alternately, the housing may be used in conjunction with a slide hammer instead of drive bolt. In this embodiment, the male threaded shaft of the slide hammer is threaded onto the third channel. The subsequent operation of the slide hammer utilizes impact forces applied to the ball to remove the ball, as opposed to applying a direct force to the support shaft and thereafter utilizing the reaction forces on the ball to effect its removal.

DETAILED DESCRIPTION OF THE DRAWINGS

The ball puller generally 9 of the invention includes a housing 10 and an associated threaded drive bolt member 12 which is threadedly inserted in housing 10.

The Housing

Figure 1:
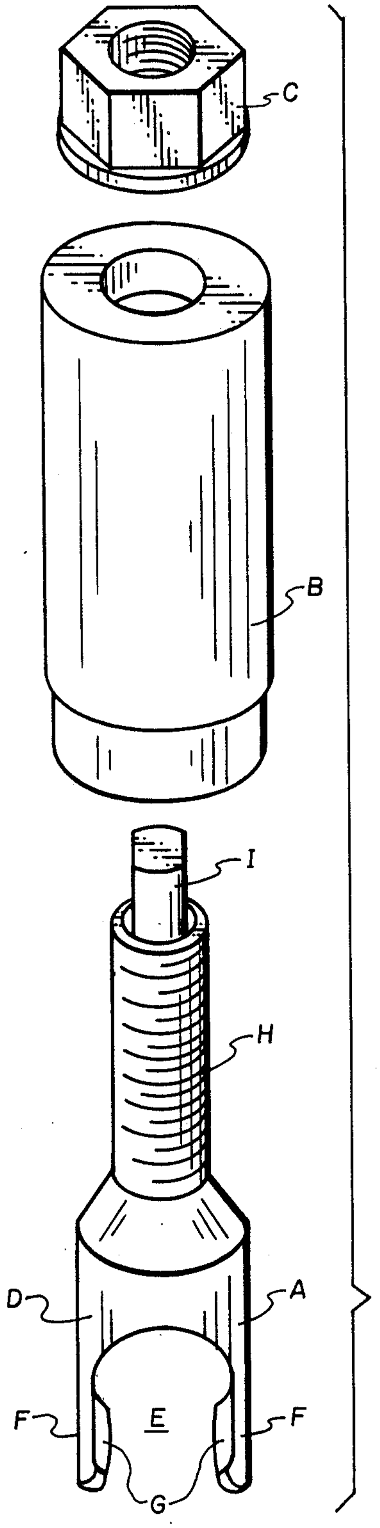
Fig. 1 PRIOR ART
FIG. 1 is an exploded view of a prior art ball puller.
Figure 2:
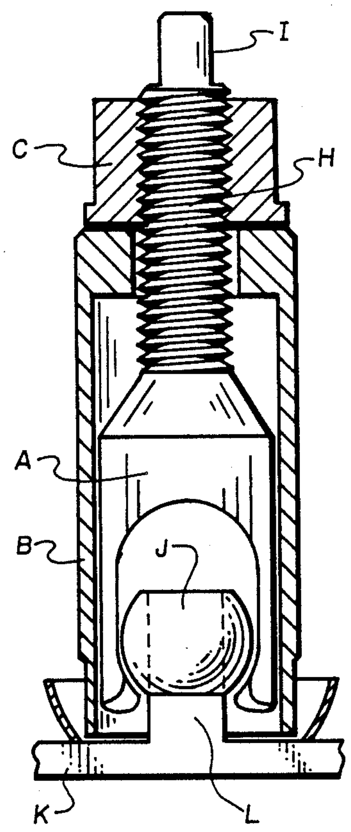
Fig. 2 PRIOR ART
FIG. 2 is a cross-sectional front view of the prior art ball puller of FIG. 1.
Figure 3:
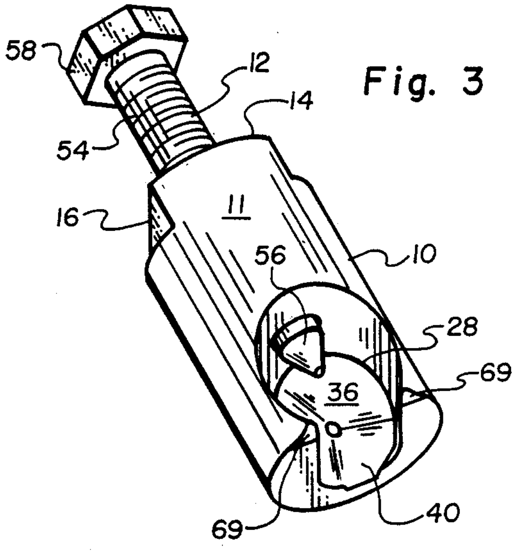
FIG. 3 is a perspective view of the ball puller of the invention showing the ball-receiving recess well thereof.
Figure 5:
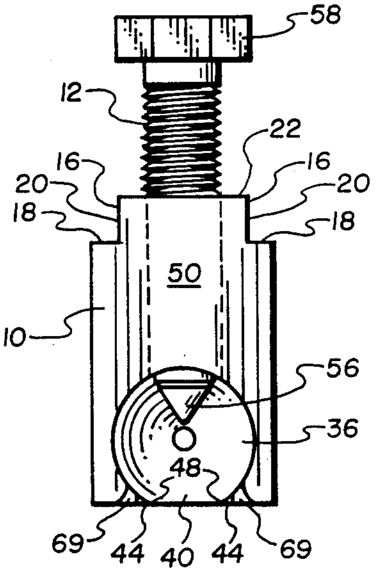
FIG. 5 is a front view of the ball puller of FIG. 3.
Figure 4:
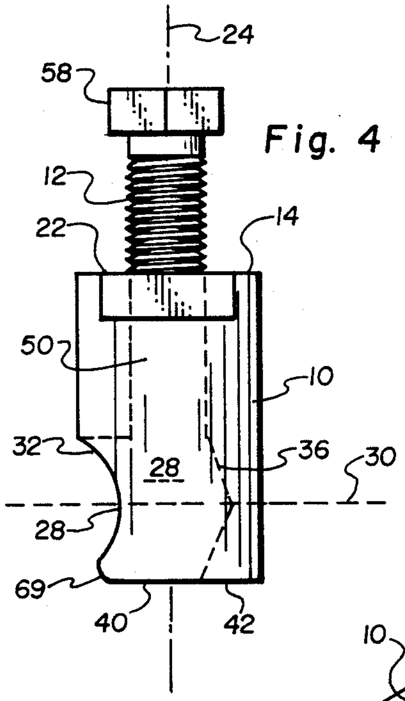
FIG. 4 is an elevational side view of the ball puller of FIG. 3.

Housing 10 is an elongate upright member having a generally right cylindrical configuration. The housing is fabricated from solid metal stock, e.g. steel. The top end 14 of the housing 10 defines a pair of upright planar surfaces 16 which are positioned spacedly and parallel to one another. The top end 14 further defines two horizontal planar surfaces 18 which may be oriented coplanarly as shown in FIG. 5. Each planar surface 18 intersects perpendicularly a respective planar surface 16 to form a platform 20 for receiving one of the jaws of a conventional wrench. The two platforms 20 are oriented such that a user may place the opposing jaws of a wrench onto the two platforms. By holding the wrench firmly and that a user may place the opposing jaws of a wrench onto the two platforms. By holding the wrench firmly and immovably, the user may retain the housing fixed in place.

The top end 14 also defines a flat planar end surface 22 which is oriented orthogonal to the longitudinal axis 24 of the housing 10.

Figure 8:
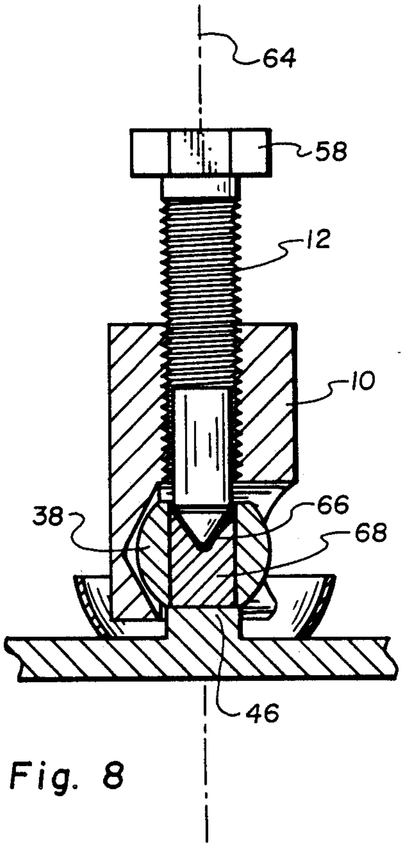
FIG. 8 is an elevational side view of the ball puller of FIG. 3 shown installed over a ball to be pulled.

Housing 10 defines three distinct channels therein. A first channel 28 is a generally cylindrically shaped channel having a longitudinal axis 30 oriented generally orthogonal to the axis 24 of the housing 10. First channel 28 is open on its first end and communicates with the environment by means of a port 32 defined on the upright sidewall 11 of housing 10. The first channel 28 forms a semicircular cross-sectioned floor surface for supporting a ball received in the channel 28. The opposing end 34 of first channel 28 is closed. As shown in FIGS. 3–6 and 8, the end 34 of channel 28 is formed by a generally concave endwall 36. The endwall 36 is configured to receive and correspond to the exterior spherical surface of a ball 38 which is to be pulled by the invention. As shown by FIG. 8, the endwall is configured to closely correspond to the shape of the ball 38 whereby upon the interaction of the invention with the ball 38, the ball 38 may abut against the endwall 36 with little or no expansion of that channel 28.

In a preferred construction, channel 28 is formed by drilling a hole through the upright sidewall 11 of the housing 10. That drilling only extends partially through the width of the housing 10 with the endwall 36 being formed by the cone-like tip of the drill bit.

Figure 6:
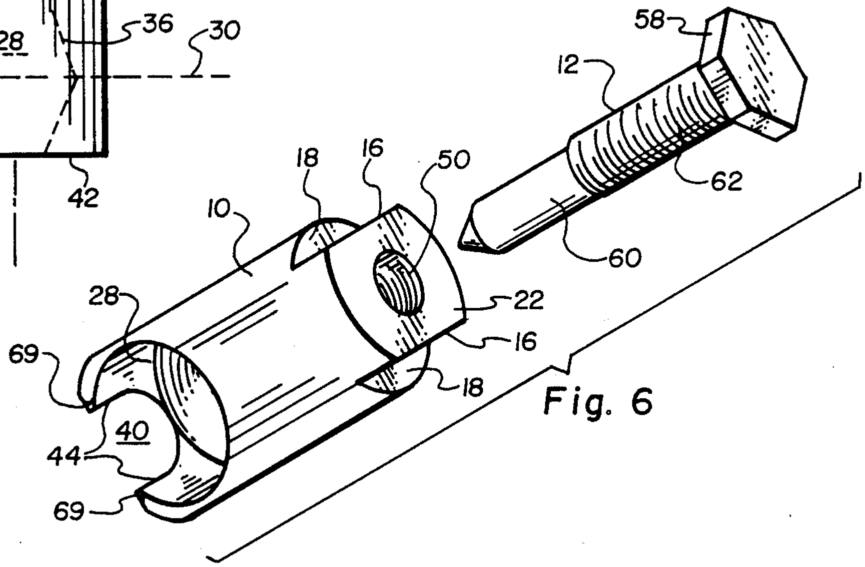
FIG. 6 is an exploded view of the ball puller of FIG. 3 showing the threaded bolt member thereof removed from the puller housing.

A second channel 40 may be more aptly described as a port. The channel 40 extends from the bottom endwall 42 of housing 10 upwards and intersects the first channel 28. As shown in FIG. 6, the channel 40 communicates through the endwall 42 with the environment. Channel 40 has a generally semicircular or "U"-shaped cross-section. The intersection of channel 40 and channel 28 defines a pair of opposingly positioned lips or flanges 44 which extend from endwall 36 to the port 32. The lips 44 are dimensioned to be received beneath the spherical ball 38 and the support structure 46 of that ball 38, as shown in FIG. 8. As shown to advantage in FIG. 5, the lips 44 are very narrow proximate their edges 48.

Figure 7:
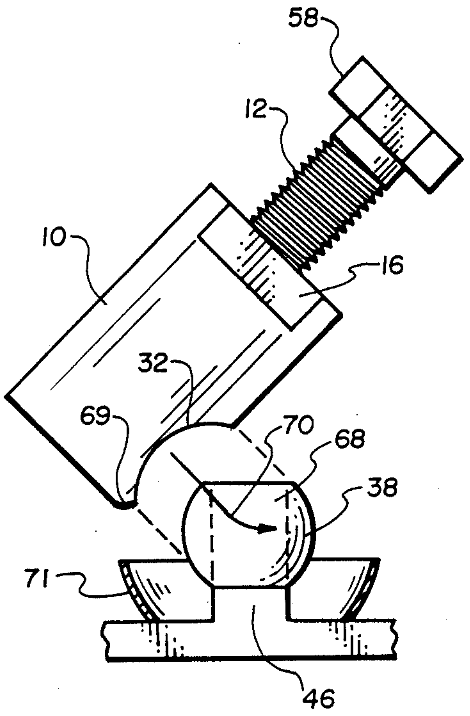
FIG. 7 is a side view of the ball puller of FIG. 3 showing the placement thereof over a ball to be pulled.

A third channel 50 is a generally right cylinder-shaped channel oriented coaxially with housing axis 24. Channel 50 extends from a port 52 defined within top end 14 downward through housing 10, eventually intersecting channel 28. The sidewalls of channel 50 define a plurality of female threads, as shown in FIG. 8. The radii 69 of housing 10 are cut, as shown, to allow the positioning of the housing 10 as shown in FIG. 7. The shield 71 generally prevents the tool from being positioned about the ball 38 by a lateral directioned placement.

The Drive Bolt

The drive bolt 12 includes an elongate cylindrical shaft 54, an inverted conical shaped end extension 56 mounted on a first end of that shaft 54, and a polygonally shaped head 58 mounted on its opposing second end. In a preferred construction, the bolt is of an integral construction.

Shaft 54 has two distinct surface configurations. The lower end 60 of the shaft 54 has a smooth, curved sidewall, the upper end 62 has a plurality of male threads configured to be threadedly inserted into the female threads defined as the sidewalls of channel 50.

An end extension 56 is configured to be received within an inverted cone-shaped recess well 66 defined within a central ball shaft support 68.

The polygonal-sided head 58 is configured to be grasped by a wrench, e.g. socket end, whereby the bolt 12 may be rotated about its axis 64 and either threadedly driven into or threadedly retracted from channel 50.

The puller 9 is adapted for removing a substantially spherical ball 38 from an elongate shaft support 68 which extends through the ball 38. The ball 38 and its respective support shaft 68 are shown to advantage in FIGS. 7–8.

To effect the ball 38's removal, the bolt-fitted housing 10 is tilted as shown in FIG. 7, whereby the port 32 is oriented to present its maximum profile. Thereafter, the housing is positioned over and atop the ball 38 by a displacement generally along the direction indicated by arrow 70. The lips 44 are positioned beneath the ball 38. The ball 38 is positioned substantially within the first channel 28, the endwall 36 being oriented substantially contiguous or in abutment against the ball 38. The head 58 of the bolt 12 may then be grasped by a wrench such as a socket wrench, end wrench, or power wrench. The wrench tabs 26 of the housing 10 may also be grasped by a suitable wrench to retain the housing stationary. Upon turning the bolt 12, the end thereof is urged against the support shaft of the ball, thereby causing the housing 10 to be displaced upwardly, effecting an upwardly directed force against the ball 38. Continued rotation of the bolt 12 eventually effects a removal of the ball 38 from its support shaft.

It is to be understood that the embodiments of the invention described are merely illustrative of the application of the principles of the invention. Reference herein to the details of the illustrated embodiment is not intended to limit the scope of the claims which themselves recite those features regarded as essential to the invention.

I claim:

1. A device for removing a substantially spherical ball from a support shaft mounted within said ball, said device comprising:

a housing having a first end, a second end and an upright exterior sidewall, said housing defining a first inlet in said first end and a second inlet in said upright exterior sidewall thereof, said housing defining a laterally extending, cylindrical first channel therein which extends partially through a thickness of said housing and communicates with said second inlet; said first channel defining a generally semicircular cross-sectioned support floor, said housing further defining a vertically extending second channel which extends partially through a height of said housing and communicates with said first inlet; said first channel and said second channel intersecting one another within said housing, said first and second channels being dimensioned to receive a spherical ball mounted on a support shaft, said housing further defining a vertically extending third channel which extends from said first channel, through a height of said housing to communicate with a third inlet opening defined in said second end of said housing; said third channel being adapted for cooperation with a drive means; wherein said first channel is configured to receive and retain said spherical ball atop said semicircular support floor of said first channel and said second channel is configured to receive said support shaft, a drive means mounted in said third channel, said drive means being urgeable against said support shaft, whereby an abutment of said drive means against said support shaft effects a detachment force application on said spherical ball by means of said semi-circular support floor.

2. The device of claim 1, wherein a drive means for applying a force against said support shaft is mounted within said third channel.

3. The device of claim 2, wherein said drive means is a male threaded drive shaft, threadedly inserted into said third channel, said drive shaft having a first end and a second end, said first end being configured to be grasped and rotated whereby said drive shaft may be displaced into and out of said third channel.

4. The device according to claim 1 wherein an end of said first channel is defined by a conically shaped concave endwall formed by said housing.

5. The device according to claim 1, wherein said housing defines a pair of flats configured to be grasped by a wrench for retaining said housing against a rotation thereof by an action of said drive shaft.

6. The device according to claim 1, wherein said first drive shaft end is polygonal is shape.

7. The device according to claim 1, wherein said third channel is linear in configuration and oriented coaxially with said housing.

8. The device according to claim 1, wherein said drive shaft has a second end having a conical configuration.

9. The device according to claim 1, wherein said second channel is generally semi-circular in cross-section.

10. The device according to claim 1, wherein a radius of curvature of said concave endwall corresponds substantially to a radius of curvature of a circular cross-section of said first channel.

11. The device according to claim 5, wherein said flats are formed by a pair of uprightly-oriented planar surfaces spacedly positioned apart from one another on said housing's second end.

12. A device for removing a substantially spherical ball from a support shaft centrally mounted within said spherical ball, said device comprising:

an elongate upright housing having a first end, a second end, a thickness, a height, and a sidewall which extends between said ends, said housing sidewall defining a substantially semicircular first inlet on said housing first end and a substantially circular second inlet in said housing sidewall, said housing defining a laterally extending right cylindrical first channel therein which extends partially through said housing thickness and communicates with said second inlet; an end of said first channel being formed by a conically concave endwall having a radius of curvature substantially identical to a radius of curvature of a cross-section of said first channel, said first channel defining a generally semicircular cross-sectioned floor, said housing further defining a vertically extending second channel which extends partially through said housing height, and communicates with said first inlet, said second channel having a substantially semi-circular cross-section, said first and second channels intersecting one another at substantially a right angle, said housing further defining a right cylindrically configured third channel which communicates with said first channel on its one end and with a third inlet defined in said housing second end, on its opposing end, said third channel defining a plurality of female threads therein; and a drive shaft bolt having a plurality of male threads along a length thereof, threadingly inserted into said third channel for threaded insertion into and out of said third channel, said bolt having a polygonal head adapted to be grasped and rotated by a suitable tool, said bolt having a first end adapted to engage said ball support member and upon a rotation of said bolt head exert a force thereagainst;

wherein said first and second channels are configured to receive and retain a spherical ball and its said support shaft, said drive shaft bolt being urgeable against said support shaft by a rotation of said first drive shaft bolt end whereby an abutment of said first drive shaft bolt end against said support shaft effects a detachment force application to said ball by means of a curvilinear, arc-shaped, cross-sectioned lip defined by said housing at said intersection of said first channel and said second channel.

13. The device of claim 4 wherein said endwall is configured to correspond to the exterior spherical surface of a ball.

* * * * *

UNITED STATES PATENT AND TRADEMARK OFFICE

CERTIFICATE OF CORRECTION

PATENT NO. : 4,970,771

DATED : November 20, 1990

INVENTOR(S) : Thomas H. Wood

It is certified that error appears in the above-identified patent and that said Letters Patent is hereby corrected as shown below:

In column 3, lines 51-53, delete "By holding the wrench firmly and that a user may place the opposing jaws of a wrench onto the two platforms."

In column 6, line 1, after "1" insert therefore --,--.

Signed and Sealed this

Twentieth Day of April, 1993

*Attest:*

MICHAEL K. KIRK

*Attesting Officer*

*Acting Commissioner of Patents and Trademarks*